United States Patent [19]

Aksamit

[11] E Re. 31,504

[45] Reissued Jan. 24, 1984

[54] SAW CHAIN SHARPENING FIXTURE

[75] Inventor: Frank J. Aksamit, West Hartford, Conn.

[73] Assignee: Pro Sharp Corporation, Newington, Conn.

[21] Appl. No.: 173,826

[22] Filed: Jul. 30, 1980

Related U.S. Patent Documents

Reissue of:

[64] Patent No.: 4,173,908
Issued: Nov. 13, 1979
Appl. No.: 866,366
Filed: Jan. 3, 1978

[51] Int. Cl.[3] ..... B23D 63/16

[52] U.S. Cl. ..... 76/25 A; 76/36

[58] Field of Search ..... 76/25 A, 31, 36, 37, 76/78 A, 74, 78 R; 33/202; D8/71, 91

[56] References Cited

U.S. PATENT DOCUMENTS

| | | | |
|---|---|---|---|
| 162,796 | 5/1875 | Bryson | 33/202 |
| 433,465 | 8/1890 | Harman | 33/202 |
| 1,141,451 | 6/1915 | Erlei | 33/202 |
| 2,643,553 | 6/1953 | Evanoff | 76/25 A |
| 2,707,409 | 5/1955 | Fitch | 76/31 |
| 2,805,587 | 9/1957 | Goehle | 76/25 A |
| 3,055,115 | 9/1962 | Tyrrell | 33/202 |
| 3,093,016 | 6/1963 | Spence | 76/25 A |
| 3,172,306 | 3/1965 | Kephart, Jr. | 76/36 |
| 3,365,805 | 1/1968 | Carlton | 76/31 |
| 3,670,600 | 6/1972 | Arff | 76/25 A |
| 3,744,349 | 7/1973 | Juncker | 76/25 A |
| 3,905,118 | 9/1975 | Ballew | 76/25 A |
| 3,935,757 | 2/1976 | Granberg | 76/74 |
| 3,942,255 | 3/1976 | Bakoledis | 76/36 |

FOREIGN PATENT DOCUMENTS

| | | | |
|---|---|---|---|
| 587303 | 11/1959 | Canada | 76/25 A |

*Primary Examiner*—Roscoe V. Parker
*Attorney, Agent, or Firm*—Prutzman, Kalb, Chilton & Alix

[57] ABSTRACT

A saw chain sharpening fixture is disclosed featuring an inverted U-shaped frame adapted to be installed on a cutter bar of a chain saw and having a sharpening opening in a frame. A pair of sharpening tool adaptor guides are mounted on sidewalls of the frame and diverge outwardly from the sharpening opening, the adaptor guides each having an elongated bearing surface the lowermost portion of which is adapted to be disposed below the top of the cutter bar for supporting a sharpening tool adaptor on a selected one of the guides.

12 Claims, 7 Drawing Figures

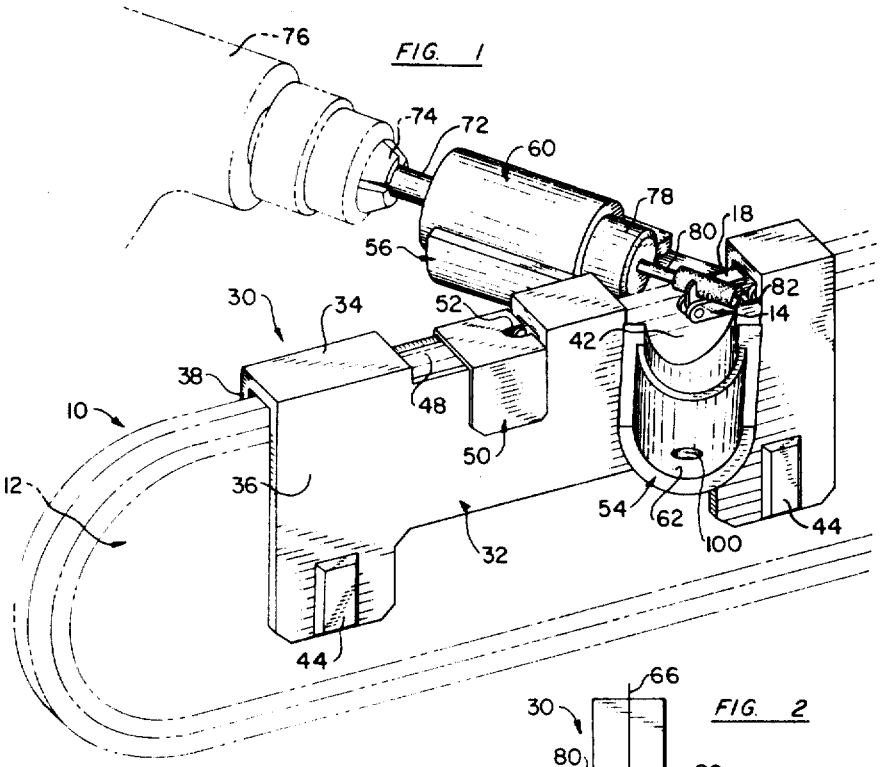
FIG. 1
76
74
72
60
78
80
18
56
82
14
30
34
52
42
38
48
10
50
12
36
54
62
100
44
32
44
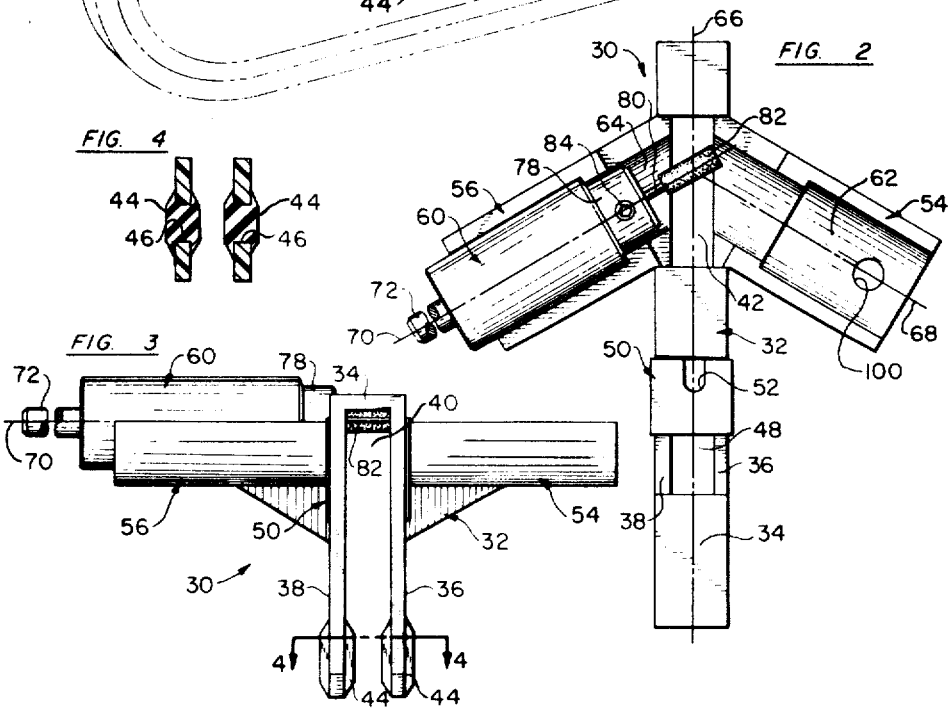
FIG. 2
66
30
80
64
82
84
78
62
56
54
60
72
42
70
68
32
50
100
52
48
36
38
34
FIG. 4
44
44
46
46
FIG. 3
72
60
78
34
40
70
82
56
50
54
32
30
38
36
4
4
44
44

SAW CHAIN SHARPENING FIXTURE

Matter enclosed in heavy brackets [ ] appears in the original patent but forms no part of this reissue specification; matter printed in italics indicates the additions made by reissue.

This invention relates to a saw chain sharpening fixture.

A primary object of this invention is to provide a new and improved saw chain sharpening fixture which is quick and easy to use and readily installed on a cutter bar of a chain to precisely position a sharpening tool relative to a saw tooth to be sharpened with the sharpening tool being supported for movement in spaced relation to the fixture.

Another object of this invention is to provide a new and improved fixture of the type described which features an adaptor having a non-abrasive surface supported on a bearing guide surface of the fixture such that the abrasive sharpening tool is itself provided bearing support within the adaptor in spaced relation from the bearing guide surface of the fixture to effect precise sharpening movements of the sharpening tool.

A further object of this invention is to provide such a fixture having an extensive service life and which may be quickly and easily manufactured at reduced cost.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

In the drawings:

FIG. 1 is an isometric view of a saw chain sharpening fixture of this invention installed on a cutter bar of a chain saw and showing a grinding wheel adaptor mounted in position on the fixture;

FIG. 2 is a top view, partly broken away, showing the fixture and grinding wheel adaptor of FIG. 1;

FIG. 3 is an end view of the fixture and grinding wheel adaptor of FIG. 1;

FIG. 4 is a section view taken generally along line 4—4 of FIG. 3;

Figure 5:
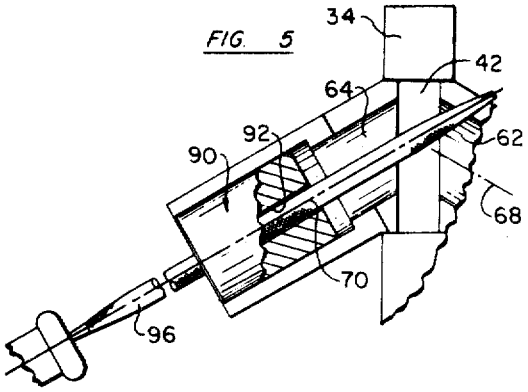
FIG. 5 is a top view, partly broken away and partly in section, showing a file adaptor suitable to be used with the fixture of this invention.

Referring to the drawings in detail, a chain saw 10 is illustrated in part in FIG. 1 having a cutter bar 12 and saw chain 14 mounted in a conventional manner on the cutter bar 12. The chain 14 includes a series of cutting links with left-hand teeth and right-hand teeth alternately arranged in succession on the chain 14.

Figure 7:
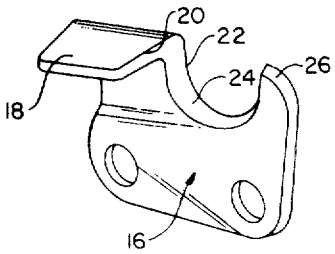
FIG. 7 is an enlarged isometric view of a cutting link of a saw chain.

Each cutting link such as the one shown at 16 in FIG. 7 has a laterally extending rear tooth 18 contained in a horizontal plane with a forwardly facing routing edge 20. The routing edge of the tooth 18 merges with a scoring edge 22 which is part of a gullet 24 separating the routing edge 20 from an upstanding depth gage 26 at the leading end of the cutting link 16. The tip of the depth gage 26 should be spaced below the routing edge 20 at an optimum predetermined distance depending on the size of the cutting link 16. The tooth portion which defines the routing edge 20 inclines both rearwardly and downwardly, and the gullet portion defining the scoring edge 22 inclines rearwardly as illustrated. Cutting links of this type are typically ground at a so-called rake angle which may vary somewhat depending on the specifications of the chain manufacturer.

To quickly and easily sharpen teeth of a saw chain of the type described, in a simple, straightforward operation readily implemented even by those unskilled in the art, a fixture 30 of this invention is provided which comprises a unitary one piece frame 32 formed of a hard plastic or any other suitable material or combination of materials. The frame 32 is designed to straddle the cutter bar 12 and an upper section of the chain 14. Frame 32 is of an inverted generally U-shaped cross section including a web 34, which extends across the top of the chain 14, and a pair of spaced confronting sidewalls 36, 38 depending from opposite sides of web 34. Web 34 and sidewalls 36, 38 jointly define an interior cutter bar and chain receiving channel 40. Communicating with channel 40 is a sharpening opening 42 formed in the web 34 and sidewalls 36, 38 intermediate the ends of the frame 32. In the embodiment illustrated in FIGS. 1—4, the bottom of the sidewalls 36, 38 of the frame 32 each are shown as having a pair of cutter bar engaging clamping pads 44 secured within vertical slots 46 extending upwardly from opposite lower corners of each sidewall 36, 38. The pads 44 may be formed of any suitable resilient or elastomeric material for firmly clamping the face of the cutter bar 12 between the sidewalls 36, 38 to resist undesired sliding movements.

A depth gage opening 48 is formed in the web 34 and an inverted U-shaped clip 50 fits over the opening 48 such that a slot 52 provided on an upper rear edge of the clip 50 is disposed to receive the depth gage 26 of successive cutting links 16 of chain 15. The clip 50 may be adjusted within the opening 48 for proper positioning of slot 52 relative to the depth gages 26 of the cutting links 16. The height of the upper surface of the clip 50 is predetermined in relation to the desired vertical distance between the highest point on the routing edge 20 of a tooth and the highest point on the tip of the depth gage 26 such that when the depth gages 26 of the cutting links 16 are moved into position within the slot 52 of the clip 50, the tip portion, if any, of the depth gage 26 extending above the clip 50 may be simply filed down to that optimum distance below the highest point on the routing edge 20 of each tooth.

To provide a compact fixture 30 of simplified construction having an extensive service life and to ensure that the bearing surface of the fixture serving as a reference guide to precisely position a sharpening tool is not in contact with an abrasive face of the sharpening tool, the fixture 30 features a pair of adaptor guides 54, 56 respectively mounted on sidewalls 36, 38 of frame 32 below its web 34 and diverging outwardly from the sharpening opening 42 at substantially the rake angles of the left-hand and right-hand teeth of chain 14. By virtue of such construction, a sharpening tool adaptor such as at 60 may be located on either one of the guides 54, 56 and seated on their respective bearing surfaces 62, 64 with the adaptor 60 in turn located to support a suitable sharpening tool along an axis of movement disposed below web 34 of frame 32 in spaced relation to bearing surfaces 62, 64 of guides 54, 56.

More specifically, the lowermost portion of elongated bearing surfaces 62, 64 is adapted to be disposed below the top of the cutter bar 12 when the fixture 30 is mounted in sharpening position (FIG. 1). The guides 54, 56 are shown as being equiangularly inclined relative to a longitudinally extending axis 66 of frame 32. The bearing surfaces 62, 64 of guides 54, 56 are preferably semi-circular in cross section, conforming to the generally clyindrical configuration of the adaptor 60, and extend about longitudinal geometric axes 68, 70 of guides 54, 56. The axes 68, 70 of guides 54, 56 are contained in a common plane which is in parallel underlying relation to web 34 of the frame 32 and below the routing edges 20 of the teeth of the chain 14.

The adaptor 60 may be formed of any suitable wear-resistant material, preferably metal, and has a fixed member or shaft 72 of reduced cross section projecting rearwardly from the center of the adaptor 60 to be received for attachment within a three jaw chuck 74, e.g., of conventional power operated drill 76. Adaptor 60 has an opposite terminal end 78 of reduced diameter which in the preferred embodiment is received in either of the guides 54, 56 within correspondingly reduced diameter portions of bearing surfaces 62, 64. The terminal end 78 of the adaptor 60 has a center opening for receiving a shaft 80 of a grinding wheel 82 of predetermined diameter in coaxially aligned relation to adaptor 60 and, due to the previously described construction, coincident with the geometric longitudinal axes 68, 70 of guides 54, 56 respectively when the adaptor 60 is seated therein.

Upon securing the grinding wheel 82 in fixed relation to the adaptor 60 by means such as illustrated set screw 84, and upon seating the smooth, non-abrasive adaptor 60 in one of the guides and advancing the chain 14 under the fixture 30 to engage the curved cutting edges of a tooth against the grinding wheel 82, the wheel 82 will be aligned at the proper rake angle to sharpen each of the series of teeth projecting in a direction opposite the side of the fixture 30 wherein the adaptor 60 is seated. During sharpening, adaptor 60 and its grinding wheel 82 are simply rotated upon power operating the drill 76, and the grinding wheel 82 is slowly drawn across the cutting edges of a tooth. Bearing surface 62 or 64 on which the adaptor 60 is seated, maintains the adaptor 60 and its grinding wheel 82 in precisely aligned relation to the cutting edges of the link 16 which is being sharpened.

Upon successively sharpening each of the series of teeth on one side of the cutter bar 12, the adaptor 60 is then positioned within the opposite adaptor guide to sharpen the other series of teeth. Once all cutting links 16 have been sharpened, their depth gages 26 are successively checked. Should any one of the gages 26 project above the slot 52 in the clip 50, the tip of the gage is filled flush with the clip 50 to complete the chain sharpening.

Figure 6:
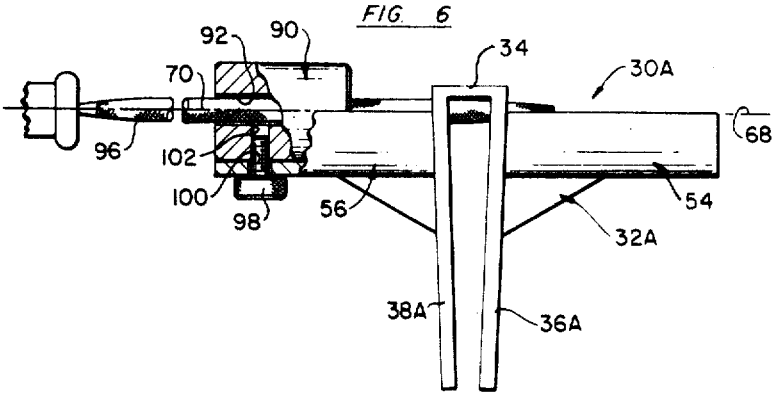
FIG. 6 is an end view of the fixture showing the adaptor of FIG. 5 mounted in position on the fixture.

Turning to the embodiment illustrated in FIGS. 5 and 6, the sidewals 36A, 38A of the fixture 30A are shown extending downwardly in spaced confronting relation similarly to that shown in the embodiment of FIGS. 1—4, but the sidewalls 36A, 38A are tapered downwardly toward one another to effect improved cutter bar clamping. The construction of the fixture 30A in the embodiment of FIGS. 5 and 6 is otherwise substantially identical to that described in the embodiments of FIGS. 1—4 and the same reference numbers have been applied. However, FIGS. 5 and 6 illustrate the fixture 30A featuring use of a hand file adaptor 90 having a central opening 92 extending through the adaptor. Upon being seated on either bearing surface 62 or 64 of guides 54 or 56, the central opening 92 of adaptor 90 is automatically coaxially aligned with the geometric longitudinal axis 68 or 70 of the respective guide 54 or 56. Accordingly, adaptor 90 is particularly suited to receive a hand file such as the illustrated rat-tail file 96 for reciprocal movement along either axis 68 or 70 below web 34 of frame 32A in registration with the curved cutting edges of the teeth to be sharpened within the sharpening opening 42. The adaptor 90 itself may be readily formed with a tough wear-resistant surface on the interior walls surrounding its central opening 92 whereby abrasive action of file 96 is effectively withstood to extend the service life of the components of the fixture 30A without significant wear on the sharpening guide bearing surfaces 62, 64 which are remotely spaced apart relative to the file during use. In the specifically illustrated embodiment, the hand file adaptor 90 is preferably fixed in position by means of a thumb screw 98 which extends through opening 100 in the bottom of each adaptor guide 54, 56 and is threadably engaged within an opening 102 in the adaptor itself. Once the adaptor 90 is secured in position in one of the guides 54, 56, every other tooth on the saw chain 14 may be sharpened with a steady slow stroke over the scoring and routing edges 22, 20. Once all teeth, say, of the left-hand series of teeth have been sharpened, the adaptor 90 may be removed from guide 56 by releasing the thumb screw 98, and then the adaptor 90 is fixed in the opposite adaptor guide 54 to sharpen the right-hand series of teeth to complete the chain sharpening.

As will be apparent to persons skilled in the art, various modifications, adaptations and variations of the foregoing specific disclosure can be made without departing from the teachings of this invention.

I claim:

1. In an assembly for sharpening cutting links of a saw chain having the cutting links mounted on a cutter bar and comprising a sharpening tool and a fixture of the sharpening tool, the improvement wherein the fixture comprises a longitudinally extending frame for straddling the cutter bar and a section of chain mounted on the cutter bar, the frame having an inverted generally U-shaped cross section including a web adapted to freely rest on and be supported by the top of the cutting links and spaced confronting sidewalls depending from opposite sides of the web and defining an interior channel, said sidewalls being adapted to flex outwardly during mounting of the cutter bar and section of chain in the channel, the frame having intermediate its ends an opening formed in the web and sidewalls for communicating with the interior channel, a pair of adaptor guides respectively mounted on the sidewalls of the frame below its web and diverging outwardly from said opening, the guides being positioned in fixed nonadjusting relationship to said web and sidewalls, each guide having an elongated bearing surface of semi-circular cross section with its lowermost portion below the top of the cutter bar, and an adaptor dimensioned and configured to be seated on and supported by the semi-circular bearing surface of a selected one of the guides, the adaptor being provided with a central aperture for supporting and aligning the sharpening tool for movement along an axis disposed below the web of the frame in spaced apart relation to the bearing surfaces of the guides for sharpening a cutting link positioned within said web opening.

2. The assembly of claim 1 wherein the sharpening tool is a grinding wheel having a shaft secured in coaxial relation thereto, and wherein the adaptor comprises a rotatable cylindrical body having fixed thereto a shaft of reduced cross section projecting from the center of one end of the body, said central aperture removably securing the shaft of the grinding wheel in coaxial alignment with the adaptor.

3. A saw chain sharpening fixture comprising a longitudinally extending frame for straddling a chain saw cutter bar and a section of saw chain with cutting links mounted on the cutter bar, the frame having an inverted generally U-shaped cross section including a web adapted to freely rest on and be supported by the top of the cutting links and spaced confronting sidewalls depending from opposite sides of the web and defining an interior [cutting] *cutter* bar and chain receiving channel, said sidewalls being adapted to flex outwardly during mounting of the bar and chain in said channel, the frame having intermediate its ends an opening formed in the web and sidewalls for communicating with the interior channel, and a pair of adaptor guides respectively mounted on the sidewalls of the frame below its web and diverging outwardly from the opening intermediate the ends of the frame, the adaptor guides being positioned in fixed nonadjusting relationship to said web and sidewalls, each guide having an elongated bearing surface of semi-circular cross section with its lowermost portion adapted to be disposed below the top of the cutter bar for supportably receiving a sharpening tool adaptor dimensioned and configuration to be seated thereon and supported thereby for accurately aligning a sharpening tool along an axis disposed below the web of the frame for sharpening a cutting link positioned within said web opening.

4. The fixture of claim 3 wherein the guides are equiangularly inclined relative to a longitudinally extending axis of the frame.

5. The fixture of claim 3 further including an adaptor supported on a selected one of the semi-circular bearing surfaces for locating and guiding a sharpening tool along said axis.

6. The fixture of claim 3 further including a sharpening tool adaptor having a rotatable cylindrical body having fixed thereto a shaft of reduced cross section projecting from the center of one end of the body, and means including a central aperture in an opposite end of the adaptor body for removably securing a shaft of a grinding wheel in coaxial alignment with the adaptor, the bearing surface supporting the adaptor for rotation with its grinding wheel being disposed in spaced apart relation to said bearing surface.

7. The fixture of claim 3 wherein the longitudinal axis of the guide bearing surfaces are contained in a common plane which is in parallel underlying relation to the web of the frame.

8. The fixture of claim 3 wherein a cutter bar engaging resilient clamping pad is mounted on a lower portion of each of the sidewalls of the frame.

*9. In an assembly for sharpening cutting links of a saw chain having the cutting links mounted on a cutter bar and comprising a sharpening tool and a fixture for the sharpening tool, the improvement wherein the fixture comprises a longitudinally extending frame for straddling the cutter bar and a section of chain mounted on the cutter bar, the frame having an inverted generally U-shaped cross section including a web adapted to freely rest on and be supported by the top of the cutting links and spaced confronting sidewalls depending from opposite sides of the web and defining an interior channel, said sidewalls being adapted to flex outwardly during mounting of the cutter bar and section of chain in the channel, the frame having intermediate its ends an opening formed in the web and sidewalls for communicating with the interior channel, a pair of adaptor guides mounted on the frame below its web and diverging outwardly from said opening, the guide being positioned in fixed nonadjusting relationship to said web and sidewalls, each guide having an elongated bearing surface of semi-circular cross section with its lowermost portion below the top of the cutter bar, and an adaptor dimensioned and configured to be seated on and supported by the semi-circular bearing surface of a selected one of the guides, the adaptor being provided with a central aperture for supporting and aligning the sharpening tool for movement along an axis disposed below the web of the frame in spaced apart relation to the bearing surfaces of the guides for sharpening a cutting link positioned within said web opening.*

*10. A saw chain sharpening fixture comprising a longitudinally extending frame for straddling a chain saw cutter bar and a section of saw chain with cutting links mounted on the cutter bar, the frame having an inverted generally U-shaped cross section including a web adapted to freely rest on and be supported by the top of the cutting links and spaced confronting sidewalls depending from opposite sides of the web and defining an interior cutter bar and chain receiving channel, said sidewalls being adapted to flex outwardly during mounting of the bar and chain in said channel, the frame having intermediate its ends an opening formed in the web and sidewalls for communicating with the interior channel, and a pair of adaptor guides mounted on the frame below its web and diverging outwardly from the opening intermediate the ends of the frame, the adaptor guides being positioned in fixed nonadjusting relationship to said web and sidewalls, each guide having an elongated bearing surface of semi-circular cross section with its lowermost portion adapted to be disposed below the top of the cutter bar for supportably receiving a sharpening tool adaptor dimensioned and configured to be seated thereon and supported thereby for accurately aligning a sharpening tool along an axis disposed below the web of the frame for sharpening a cutting link positioned within said web opening.*

*11. The fixture of claim 9 or 10 wherein the guides are equiangularly inclined relative to a longitudinally extending axis of the frame.*

*12. The fixture of claim 9 or 10 wherein the longitudinal axis of the guide bearing surfaces are contained in a common plane which is in parallel underlying relation to the web of the frame.*

* * * * *